United States Patent [19]
Hilborn

[11] 3,901,080
[45] Aug. 26, 1975

[54] TEMPERATURE MEASURING DEVICE

[76] Inventor: William Dwight Hilborn, P.O. Box 15252, Houston, Tex. 77019

[22] Filed: Apr. 5, 1974

[21] Appl. No.: 458,345

Related U.S. Application Data
[63] Continuation of Ser. No. 259,176, June 2, 1972, abandoned.

[52] U.S. Cl.................................. 73/343 R; 73/359
[51] Int. Cl.² .......................................... G01K 7/04
[58] Field of Search.......... 73/343 R, 346, 349, 359, 73/361, 360; 136/221, 230, 232, 233

[56] References Cited
UNITED STATES PATENTS
3,143,439    8/1964    Hansen ................................. 136/4

Primary Examiner—Jerry W. Myracle
Attorney, Agent, or Firm—Robert W. B. Dickerson

[57] ABSTRACT

Device for measuring skin temperature of a conduit, the device having a curved surface conforming to that of the conduit, a thermocouple junction positioned adjacent the conduit surface, and a curved insulated shield fitted to the conduit and protecting the thermocouple junction.

1 Claim, 3 Drawing Figures

PATENTED AUG 26 1975

3,901,080

William Dwight Hilborn
INVENTOR.

BY

ATTORNEY

TEMPERATURE MEASURING DEVICE

This is a continuation of application Ser. No. 259,176, filed June 2, 1972, now abandoned.

BACKGROUND OF THE INVENTION

There are many industrial processes wherein there is a need to determine the temperature of a tube or conduit within a vessel such as a boiler or furnace. Exemplary situations occur during petroleum refining operations as well as in many processes utilized by the chemical industry. Temperature measuring devices have been positioned adjacent such conduits to procure an indication of the temperature of the conduit's contents, or of the wall of the conduit itself. Applicant's invention is more concerned with the latter, inasmuch as conduit rupture in the furnace itself will at least result in process shut down, and perhaps cause severe damage by fire and/or explosive reaction.

HISTORY OF THE PRIOR ART

Thermocouples, as such, have long been used for taking heat measurements. Also, cables leading to a conduit have been bent so as to conform, at least partially, to the conduit's surface. Some examples of the prior art may be seen in U.S. Pat. Nos. 1,140,701; 1,907,540; 2,048,680; 2,048,681; 2,151,648; 2,607,808; 2,627,182; 2,967,429; 3,052,123; 3,143,439; and 3,444,740. None of these permit the combination of effective measurement and thermocouple protection provided by applicant's device.

SUMMARY OF THE INVENTION

A pair of thermocouple leads, terminating in a junction would be positioned in an outer jacket. This assembly would be bent so as to conform to the outer shape of a conduit, and positioned thereagainst by a curved shield, whereby the junction may serve as an indicator of the tube skin temperature, by virtue of the e.m.f. generated.

DESCRIPTION OF A PREFERRED EMBODIMENT

Figure 1:
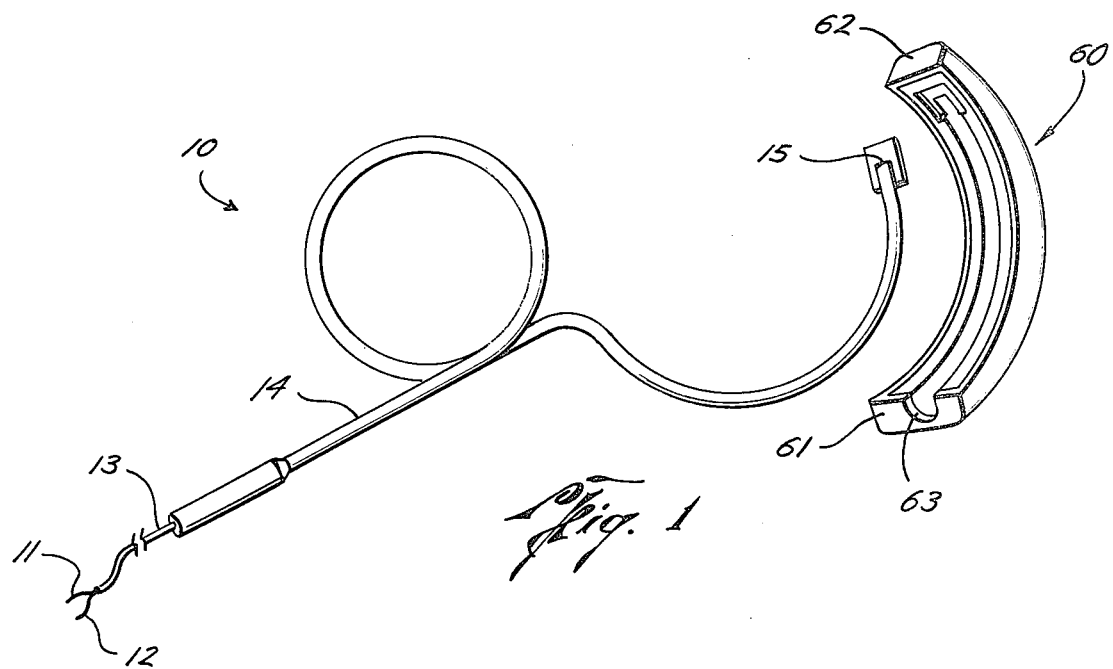
FIG. 1 is an exploded perspective of the parts, unattached to a conduit wall.

Looking first at FIG. 1, a thermocouple assembly is illustrated generally at 10. The function of such assemblies is well known. Internally, a pair of leads 11 and 12 of differing material may be insulatingly encased within a cable 13, the entire cable then being inserted within an outer jacket 14, normally metallic, and subject to being deformed. Additional insulation and/or packing may surround cable 13 within the confines of jacket 14. At or near one end 15 of the jacket, the normal hot thermocouple junction is formed by uniting leads 11 and 12, thereby causing generation of an e.m.f. which is a function of the temperature there adjacent. The portion of jacket near end 15 is shown to be curved into a semi-circle. The purpose obviously is to permit the assembly to be correlative in configuration to that of the device examined, which in this case is a cylindrical conduit — obviously other devices may require different jacket curvatures.

Figure 2:
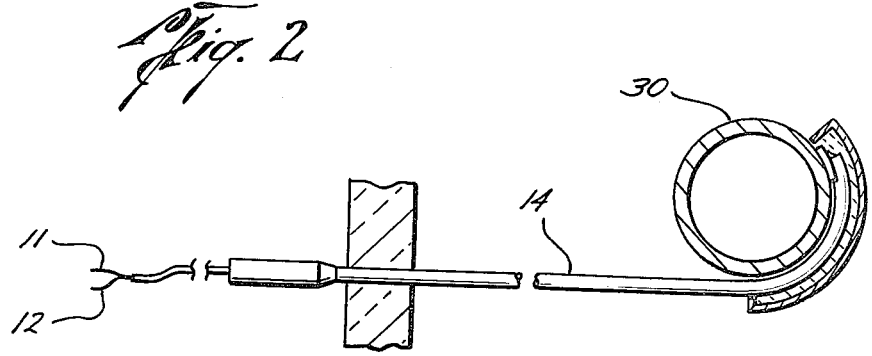
FIG. 2 depicts the assembly as attached.

As mentioned previously, the assembly of this invention is intended to be positioned outside of and adjacent to a pipe, tube or similar conduit. FIG. 2 illustrates such a placement about conduit 30, which itself may lie within a boiler or furnace.

Figure 3:
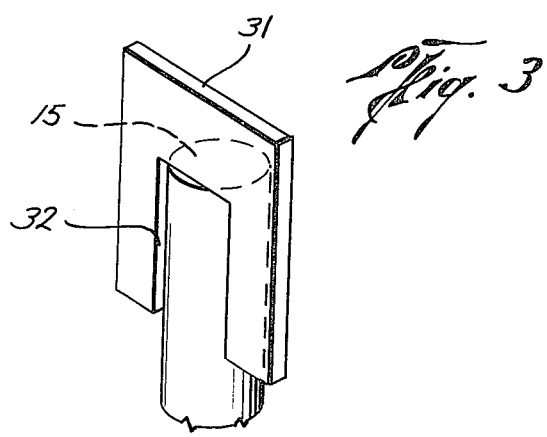
FIG. 3 is a detail of the end fitting.

FIG. 3 illustrates a means for assuring a firm contact between the thermocouple junction and the outer skin of the tube being measured. Disc, or thermocoupled junction positioning member, 31 is slotted at 32. It should be noted that said slot extends in a direction perpendicular to the axis of the conduit. This permits wrapping the jacket 14 around the conduit, rather than extending the jacket linearly along the conduit's side. Within such slot, end 15 of jacket 14 is fixedly positioned, such end containing the thermocouple junction. The disc 31, itself, may have a slightly concave surface conforming to the outer convex surface of the conduit. To this point, only the thermocouple assembly itself has been described, albeit one with decided ease of positioning, relative to a tube. A further problem, however, presents itself in the taking of such measurements. Were the junction simply placed adjacent a tube outer wall, without more, a false high reading might be expected, principally due to excess thermal radiation reaching the junction. Thus, a shield has been devised to attempt to insulate the junction from the radiation emitted directly from the furnace, for example. This shield 60 is a generally curved piece, so as to also conform to the tube outer dimensions, and is U-shaped in cross section, with ends 61 and 62. One of the shield ends, 61, is cut out or slotted, as at 63, to receive and position part of the curved portion of jacket 14. The remainder of the inside volume of shield 60 would be filled with an insulation material. The shield may then be fixed to the tube, as by welding around the shields peripheral edge. Thus, the shield effectively positions the thermocouple junction against the tube skin, but also insulates it from radiant heating. While the presence of the shield to some extent reduces the tube skin temperature in the area of the junction, it is believed that convection heating passing from the shield's outer surface to the tube outer wall, and thence to the tube area adjacent the thermocouple junction will compensate for the reduced radiant heating so as to produce a more accurate reading with a more reliable device than was heretofore possible. Of course, the thermocouple leads 11 and 12 would be electrically connected, opposite their junction forming ends, to proper instrumentation, to provide the desired readings. The loop showed in the jacket 14, may be required in some specific installations, to overcome thermal expansion problems, but is not necessary for the practice of this invention.

Although only a single embodiment of this invention has been shown and described, it should be obvious that numerous modifications would be possible by one skilled in the art without departing from the spirit of the invention, the scope of which is intended to be limited only by the following appended claims:

I claim:

1. In a thermocouple assembly adapted to be positioned adjacent a conduit in order to make temperature measurements at the surface of said conduit, the combination of:

a thermocouple junction having a pair of electrical leads therefrom positioned within an insulated cable, said cable being inserted within a hollow deformable jacket with said junction positioned adjacent one end of said jacket, said jacket being so curved as to be correlative in configuration to and adapted to be positioned around at least a portion of said conduit;

a concave thermocouple junction positioning member having a slotted portion, said slot extending in a direction perpendicular to the axis of said conduit when said jacket is positioned therearound, said slotted portion receiving said thermocouple junction containing one end of said jacket therewithin, said positioning member's concavity being correlative with the convex outer surface of said conduit; and an insulated shield of arcuate configuration correlative to that of and positionable circumferentially around at least a portion of said conduit, said shield having first and second ends, said first end forming a solid wall, said second end forming a solid wall but for an approximately semi-annular cutaway of a size adapted to clampingly press said jacket against said conduit, said shield being substantially filled with insulating material but for a circumferentially extending semi-annular cutaway portion, to accommodate said jacket, extending from said second wall cutaway to near said first wall, said circumferentially extending cutaway terminating in a further cutaway portion of said insulating material, said further cutaway portion being of approximately the size and configuration of said positioning member, said thermocouple junction containing jacket and said positioning member being positioned within said semi-annular cutaway and said further cutaway portion respectively whereby said thermocouple junction received by said positioning member is held in close proximity to the outer surface of said conduit.

* * * * *